3,329,918
HIGH VOLTAGE DIVIDER SYSTEM
Glenn E. Mealy, Cleveland, Ohio, assignor to the United
States of America as represented by the Administrator
of the National Aeronautics and Space Administration
Filed Sept. 14, 1965, Ser. No. 487,342
1 Claim. (Cl. 338—64)

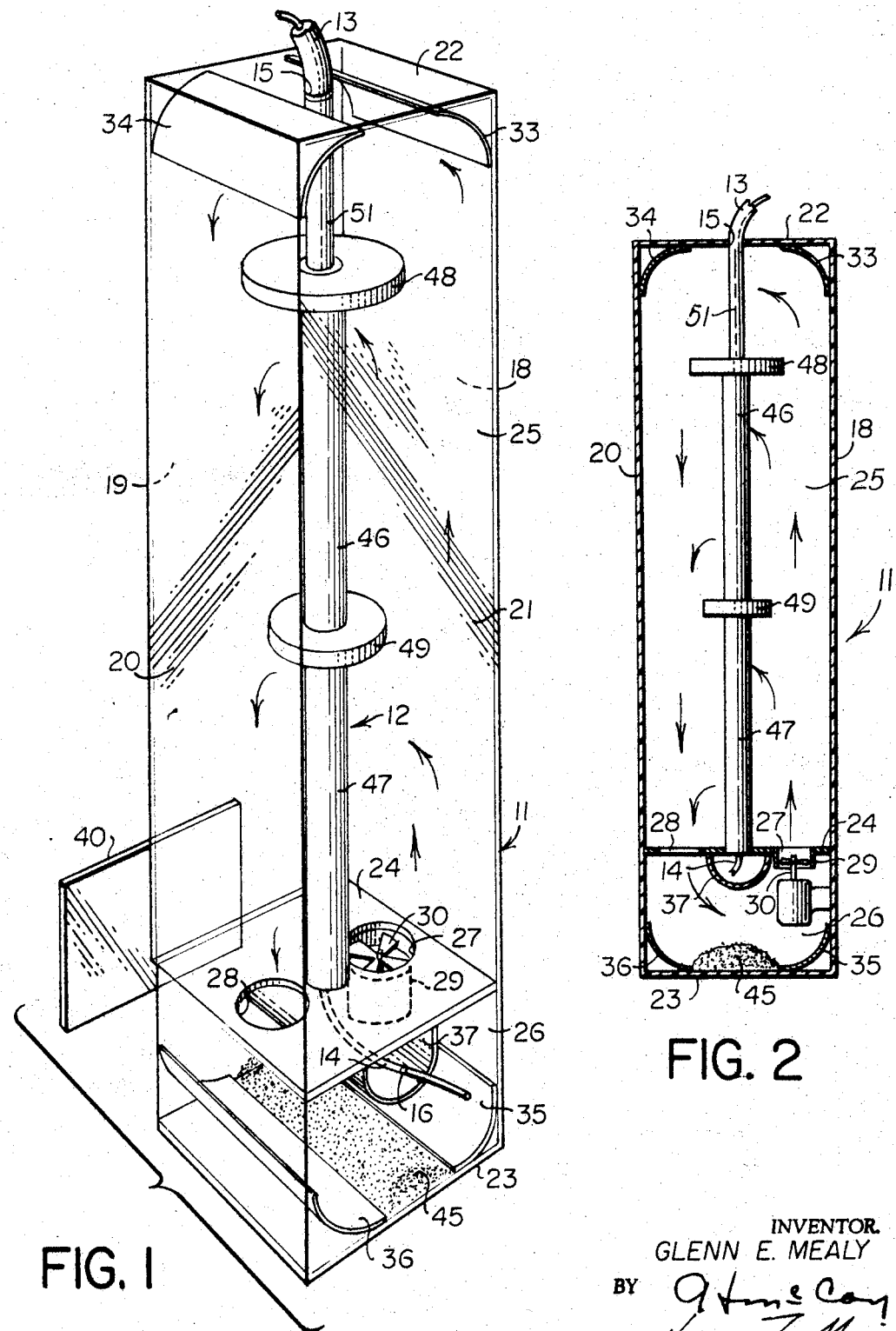

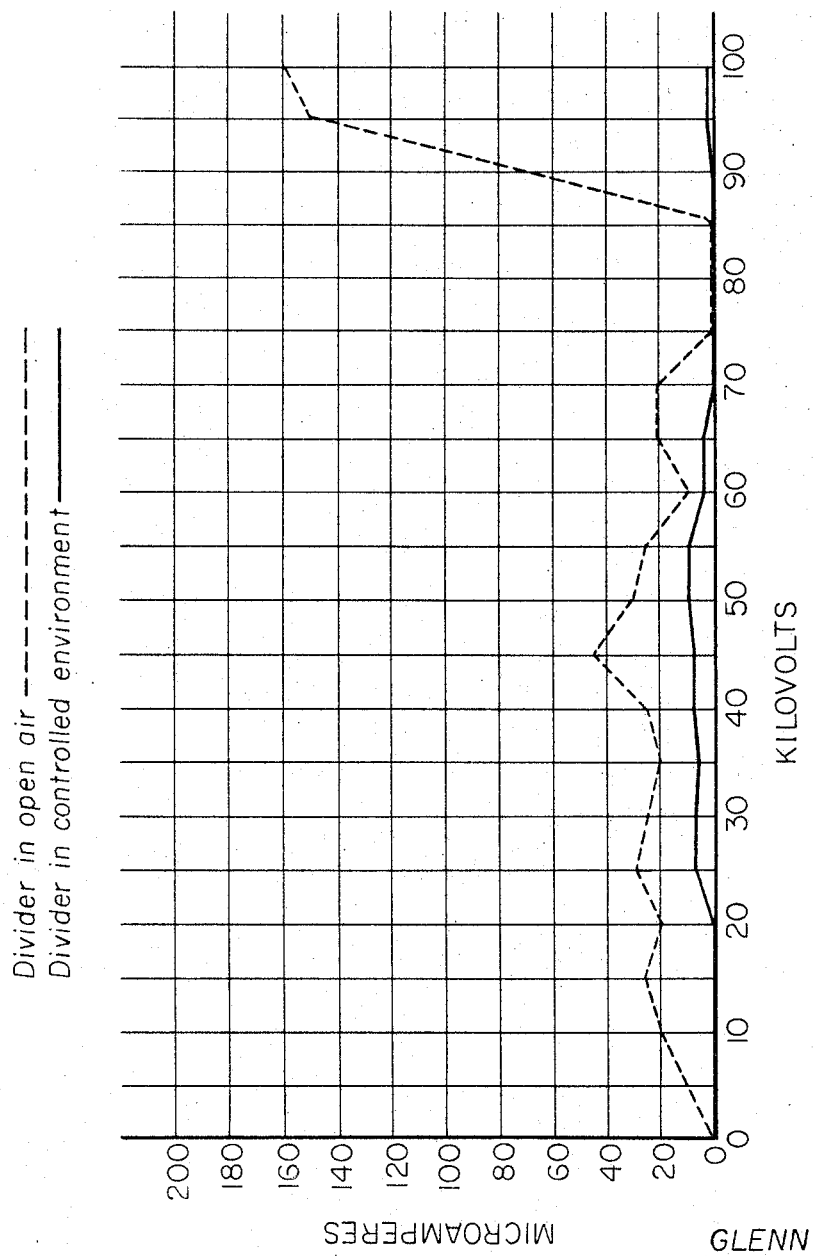

ABSTRACT OF THE DISCLOSURE

A high voltage divider system having gradient divider resistors enclosed in a corona inhibiting environment. The electrical apparatus is housed in a vapor tight container with a desicant and a fan for circulating the enclosed air.

---

The invention described herein may be manufactured and used by or for the Government of the United States of America for governmental purposes without the payment of any royalties thereon or therefor.

The present invention relates generally to high voltage divider systems and relates more particularly to voltage divider apparatuses for attenuating high voltages to convenient levels suitable for introduction, with minimal leakage losses, to measuring circuits.

The high voltage divider apparatus of the present invention is particularly suited for operation at potentials over 50 kilovolts. It is especially useable with 150 kv. meters for determining the accuracy of meter calibration and for determining the voltage outputs of power supplies associated with the operation and testing of high energy electronic equipment, for example, ion thrusters.

Prior systems employed for high voltage measurements have generally required that the high voltage divider be immersed in an insulating oil. The insulating characteristic of the oil prevents, or at least minimizes, losses along interface surfaces of the resistors employed in the divider system. In these applications, serious consideration must be given to the moisture content of the oil and to the amount of air entrapped in the oil as they directly affect the insulating qualities of the oil. In order to achieve optimum electrical insulating characteristics of the oil in these prior systems, it has been generally necessary to centrifuge the oil to remove the entrapped moisture and to evacuate the oil in a low vacuum system to remove the entrapped air.

The oil immersed voltage divider systems have the further disadvantage of being very heavy due to the quantity of oil required to immerse the interfaces of the voltage divider resistors. In addition, these systems require a great deal of maintenance since it is necessary to maintain a minimum insulating value of the oil. This requires that the insulating oil be tested frequently to assure that dirt, moisture, air and other contaminates are not present in the oil sufficiently to alter the electrical characteristics of the oil.

Another prior high voltage divider system employs sulphur hexafluoride ($SF_6$) gas, a well-known insulating fluid, to surround and fill the resistor interfaces. A disadvantage of the sulphur hexafluoride systems is that several pounds pressure is generally necessary to accomplish successful purging of the system to remove all air. This requires continuous maintenance as the system must be frequently inspected for leaks. Another disadvantage of the sulphur hexafluoride systems, as well as the systems employing insulating oil, is their extreme cost, both in the insulating mediums employed and in the special mechanical requirements of the respective systems necessary to receive the insulating mediums.

Still another prior system used widely at lower kilovoltage levels heretofore, e.g. under 50 kv., employs gradient dividing resistors and is operated in the atmosphere or open air. Corona rings are generally affixed to the gradient dividing resistors to reduce corona losses.

The gradient divider has the characteristics of distributing the potential evenly over the resistor body. This even distribution equalizes the charge at any given point along the divider thereby distributing the stress over a wide area. This characteristic of the gradient divider also prevents intense fields from establishing at any given point and thereby prevents the creation of conditions which may precipitate a sputter and a subsequent ion release which serves as a vehicle for an "avalanche" of electrons and total flashover. The corona rings have the effect of smoothing out the electrostatic fields which tend to be established at the junctions between resistors and thereby reduce the tendency to precipitate a sputter and subsequent "avalanche."

One problem, however, in these gradient divider systems is that moisture deposited on the surface of the gradient divider alters its surface resistivity at that point. The moisture also has the property of altering the interface between it and the gradient divider resistor surface so as to create an electron build-up which may precipitate a sputter and subsequent "avalanche" of electrons resulting in total flashover. Explained another way, if it is considered that the surfaces of the resistors constitute one dielectric and that the moisture constitutes another, then a potential is developed along their interface and is in a ratio of the differences of their resistivities. In view of the potential which possibly may be developed along this interface, it would appear that the electron concentration at these points can be in the power of several orders of magnitude.

These gradient divider systems have been found to operate erratically under varying humidity conditions. Increases in humidity, as verified by a psychrometer, appear to increase corona losses in varying amounts over the lower and intermediate kilovoltages (0–75 kilovolts) and increase greatly in the higher kilovoltages (85–100 kilovolts). This erratic operation of the gradient divider systems when operating in the open air is believed caused by moisture on the surface of the gradient dividers resistors which tend to alter the resistivity of the resistor surfaces at that point.

In the present high voltage divider apparatus, gradient divider resistors are enclosed in a corona inhibitive environment without, however, the maintenance problems and expense associated with the prior systems utilizing insulating oil or sulphur hexafluoride gas. In the present system, the gradient divider resistors and affixed corona rings are enclosed in a dielectric housing which is vapor tight. A compartment is provided at the bottom of the housing and is filled with a moisture absorptive or desicant material, for example, a porous activated alumina ($Al_2O_3$). A suitable moisture carrying fluid, for example, ordinary atmospheric air, is caused to circulate over the resistors comprising the gradient divider and then through the desicant compartment. The fluid flowing over the resistors serves as a vehicle for transporting moisture from the divider to the desicant material, where it is absorbed. Removing the moisture from the interfaces in this manner substantially restores stability to the operation of the gradient divider system and significantly decreases corona losses, particularly at high kilovoltage levels.

Accordingly, an object of the present invention is to provide a new and improved voltage divider system which is suitable for operating at high kilovoltage levels with a minimum of corona loss and good stability, which has a low cost of manufacture and which requires a minimum of maintenance.

Another object of the present invention is to provide a voltage divider system wherein the environment surrounding a gradient divider is controlled to remove moisture from the gradient divider and maintain it substantially moisture free.

Still another object of the present invention is to provide a voltage divider system which does not require insulating oils, special insulating gases and which can use freely available fluids under ordinary atmospheric pressure conditions.

Yet another object of the present invention is to provide a new and improved apparatus for attenuating high kilovoltages to levels suitable for introduction to measuring circuits with good stability and minimum losses.

Other objects and a fuller understanding of the invention may be had by referring to the following description and claim taken in conjunction with the accompanying drawing in which:

FIGURE 1 is a perspective view of a voltage divider system of the present invention;

FIGURE 2 is an elevational view, in cross-section of the voltage dividers of FIGURE 1; and FIGURE 3 is a graph comparing corona losses of the present system to those of a prior system.

Referring now to the drawing, the present high voltage divider system includes a transparent housing 11, a voltage gradient divider 12 disposed entirely within the housing 11, a cable 13 connected to the ends of the voltage gradient divider 12, and a lead-out wire 14 connected to the voltage gradient divider 12 between its ends. The cable 13 and the lead out wire 14 extend through openings 15, 16 in top and side walls of the housing.

The entire housing 11 is made of a suitable dielectric material preferably transparent, for example, methacrylate, more commonly known as "Plexiglas." The housing 11 includes four elongated side walls 18–21 joined along their longitudinal edges so as to define an elongated rectangular interior space and top and bottom end walls 22, 23 secured to the ends of the side walls. The side, top and bottom walls 18–23 are secured together and sealed to define a totally enclosed, vapor proof housing. A divider wall 24 extends between the side walls 18–21 between the top and bottom walls 22, 23 to divide the space within the totally enclosed housing 11 into an upper high voltage, gradient divider chamber 25 and a lower, potential free, desiccant containing chamber 26. The divider wall 24 includes fluid openings 27, 28 which provide fluid communication between the chambers 25, 26. The side wall 19 includes a removable door 40 for providing access to the interior of the desiccant chamber 26.

A cylindrical fan chamber will 29 is secured to the divider wall around the fluid opening 27 within the desiccant chamber 26. The fan chamber wall 29 defines a fan chamber communicating with the gradient divider chamber at an upper end and the desiccant chamber at a lower end. A fan, impeller, or other suitable fluid moving device 30 is disposed within the fan chamber wall 29 for causing fluid to flow from the desiccant chamber 26 into one side of the gradient divider chamber 25. Baffles 33–36, which are quarter-cylinder segments, are provided at the junctures of the top and bottom walls 22, 23 with opposite side walls 18, 20. A semi-cylindrical baffle 37 is secured to the bottom of the divider wall 24 between the fluid apertures or openings 27, 28. The semi-cylindrical baffle 37 extends between opposite side walls 19, 21 and is generally parallel to the quarter-cylindrical baffles 35, 36. The baffles 35–37 together define a substantially U-shaped space within the desiccant chamber 26. The quarter cylindrical and semi-circular baffles 33–37 are made of a dielectric material, preferably a resinous plastic material such as Mylar.

A desiccant or moisture absorbent material 45 is deposited on the bottom wall 23 within the desiccant chamber 26 through the access door 40. The function of the desiccant material 45 is to remove moisture and moisture droplets from the fluid within the housing as the fluid flows through the desiccant chamber 26 from the divider chamber 25. A suitable desiccant material is porous alumina ($AL_2O_3$). It is preferred that the porous alumina have a color tracer characteristic which provides a color indication, for example, pink, when saturated with moisture thereby providing a visual indication of its moisture content and the condition of the system.

The voltage divider comprises a plurality of resistors 46, 47 connected in series with each other and across conductors within the cable 13. Corona rings 48, 49 are affixed to the resistors 46, 47 at their interfaces where connected to each other and to the conductors of the high voltage cable 13. The meter termination lead out wire 14 extends from its tap position within the resistor through the resistor and out its lower end. The arrangement of the resistors 46, 47, the corona rings 48, 49, the cable 13 and the meter termination lead-out wire 14 is conventional. A suitable gradient divider is shown in FIGURE 2. As an illustration of size of a typical suitable gradient divider, the resistor 46 is 100 megohms, the resistor 47 is 50 megohms, the corona ring 48 is 10 inches, the corona ring 49 is 8 inches and the cable 13 is generally designated as a RG–19 cable.

The gradient divider 12 is disposed within the gradient divider chamber 25 of the housing between the divider wall 24 and the top wall 22. The cable 13 extends through the top wall 22 to its outside high voltage source connection. The meter termination lead out wire 14 extends from within the lower resistor 47 into a dead air space within the semi-cylindrical baffle 37 and through the aperture 16 in the side wall 21 to a meter circuit connection or the like. The lower end of the 50 megohm resistor 47 is fixed to the divider wall 24 by its lowermost portion which extends through a center aperture in the dividing wall 24 to fix the bottom end of the gradient divider in spaced relation to the side walls. A rigid insulating stem 51 extends from the top of the resistor 46 through an aperture in the top wall 22 to fix the upper end of the gradient divider in spaced relation to the side walls 18–21. The divider wall 24 as made of a dielectric material isolates the moisture absorbing desiccant material in its potential free space within the desiccant chamber 26 from the high voltage space within the voltage divider chamber 25.

A suitable source (not shown) is provided for energizing the fan or impeller 30 to cause the fluid to circulate in the space within the housing 11 in a loop fashion as is shown and designated by the arrows. On a proportional basis, a five inch fan has been found suitable for the gradient divider and the housing shown. As is designated by the arrows, the fluid flow is up through the fan chamber, up one side of the gradient divider chamber with the fluid being dispersed and flowing over the entire length of the gradient divider and then down the other side of the gradient divider chamber 25 through the aperture 38 into the desiccant chamber 26. Different parts or portions of the fluid flow over different parts of the gradient divider 12 throughout its entire length so that fluid flows over all surfaces of the divider. As the fluid flows over the gradient divider 12, it picks up moisture and droplets from the surfaces of the gradient divider and transports them away. The fluid then flows through the generally U-shaped desiccant chamber and sweeps over and through the alumina. The alumina absorbs the moisture transported by the flowing fluid. The fluid is then drawn from the desiccant chamber 26 through the fan chamber into the gradient chamber 25.

In the present system, the fluid serving as a vehicle to transport the moisture droplets from the divider to the desiccant material is air obtained from the atmosphere. The present system does not require, therefore, any insulating oil or insulating gases. Nor does it require the insulating fluid to be under pressure. Ordinary atmospheric conditions are present except that the environment around the gradient divider is controlled as to moisture content.

The baffles 33–37 function as aerodynamic baffles to deflect and direct fluid flowing within the housing. The quarter-cylinder baffles 33–36 as disposed in the corners of the housing and having their axes in generally parallel relation with each other and with the axis of the semicircular baffle 37 substantially eliminate turbulence and dead air spaces. The semi-cylindrical baffle 37 as projecting downwardly into the desiccant chamber from the underside of the divider wall 24 forces the fluid to travel over and through the desiccant material deposited in the desiccant chamber. The aerodynamic baffles 33–37 thereby assure sufficient air circulation over the desiccant material and the resistors.

It has been found that the removal of the moisture from the surfaces and interfaces of the resistors as taught by the present invention restores stability to the operation of high voltage divider systems over the entire metering range, particularly where the system is operating at voltage levels of 50 kilovolts and higher. It has been found that with the present system, inconsistencies in metered voltages are eliminated and the corona losses are decreased substantially. For example, in a series of tests performed at 100 kilovolts potential, corona losses, which are often as much as 160 micro-amperes in prior gradient divider systems, were reduced to 5 micro-amperes.

The present system with the resinous, plastic housing provides a lightweight, low cost structure which seldom requires maintenance. Where the preferred Plexiglas, which is transparent, is utilized as the housing material, the color tracer property of the alumina, which shows pink when saturated with moisture, provides a facile, visual means of determining the condition of the system.

The stability of operation provided by the present system can be seen from the graph in FIGURE 2. The broken line in the graph shows corona losses for a voltage range of 0 to 100 kilovolts when the resistors 46, 47 are in the open air or atmosphere and their environment is not controlled. As is shown by the broken line curve on the graph, the corona losses are erratic and result in erratic meter readings. In addition, the corona losses increase significantly over 85 kilovolts. As shown by the solid line curve, when the same gradient divider is subjected to a controlled atmosphere by the apparatus of the present invention the corona losses are decreased significantly. In addition, there is very little variation in the corona losses thereby providing stability to the entire system. It is further to be noted that there is no significant increase in the corona losses even over 85 kilovolts when a controlled environment is provided by the present method and apparatus.

Although the invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

A high kilovoltage divider system for attenuating voltages above 50 kilovolts comprising:
  a plurality of voltage dividing resistors connected in abutting relationship,
  a corona ring connected to said resistors at each of the interfaces at the abutting connections,
  circuit means connected to said resistors for supplying a high voltage above 50 kilovolts thereto,
  a vapor proof housing of a dielectric material enclosing said resistors and corona rings,
  an apertured wall within said housing for defining a first chamber containing said resistors and corona rings and a second chamber containing a desiccant material, said first and second chambers being in communication with one another through apertures in said wall,
  means for moving a fluid through said first and second chambers whereby moisture on said resistors is removed therefrom and carried to said desiccant, and
  aerodynamic baffles within said housing for deflecting and directing the flow of fluid through said chambers in a continuously circulating manner with a minimum of turbulence and disturbance.

References Cited

UNITED STATES PATENTS

| | | | |
|---|---|---|---|
| 2,154,685 | 4/1939 | Lamb | 338—64 |
| 2,293,552 | 8/1942 | Lindenblad | 338—55 |
| 2,331,773 | 10/1943 | Graham | 338—55 |
| 2,491,876 | 12/1949 | Schoenfeld et al. | 338—55 |
| 2,710,907 | 6/1955 | Westberg et al. | 338—57 |
| 2,943,283 | 6/1960 | Dorsett | 174—15 |
| 3,081,441 | 3/1963 | Paschal | 333—81 |

FOREIGN PATENTS 257,064   8/1926   Great Britain.

OTHER REFERENCES

The Review of Scientific Instruments, October 1949, vol. 20, Number 10, pages 729–731, "Stabilized High Voltage Power Supply for Electrostatic Analyzer," by R. L. Henkel and B. Petree.

RICHARD M. WOOD, *Primary Examiner.*

W. D. BROOKS, *Assistant Examiner.*